2,905,362

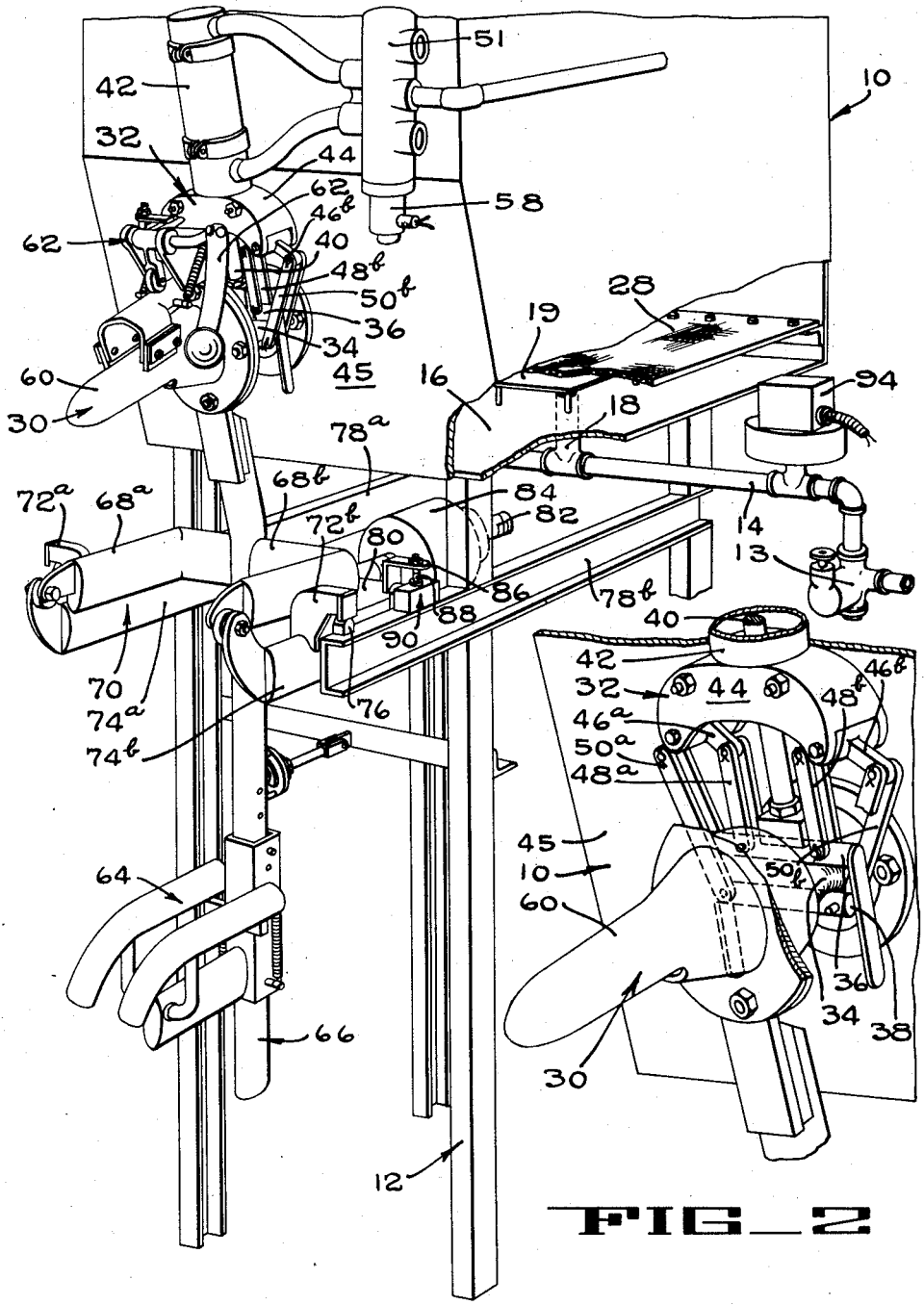
FIG_1
FIG_2
INVENTOR
PAUL C. AUST
BY Hans G. Hoffmeister
ATTORNEY

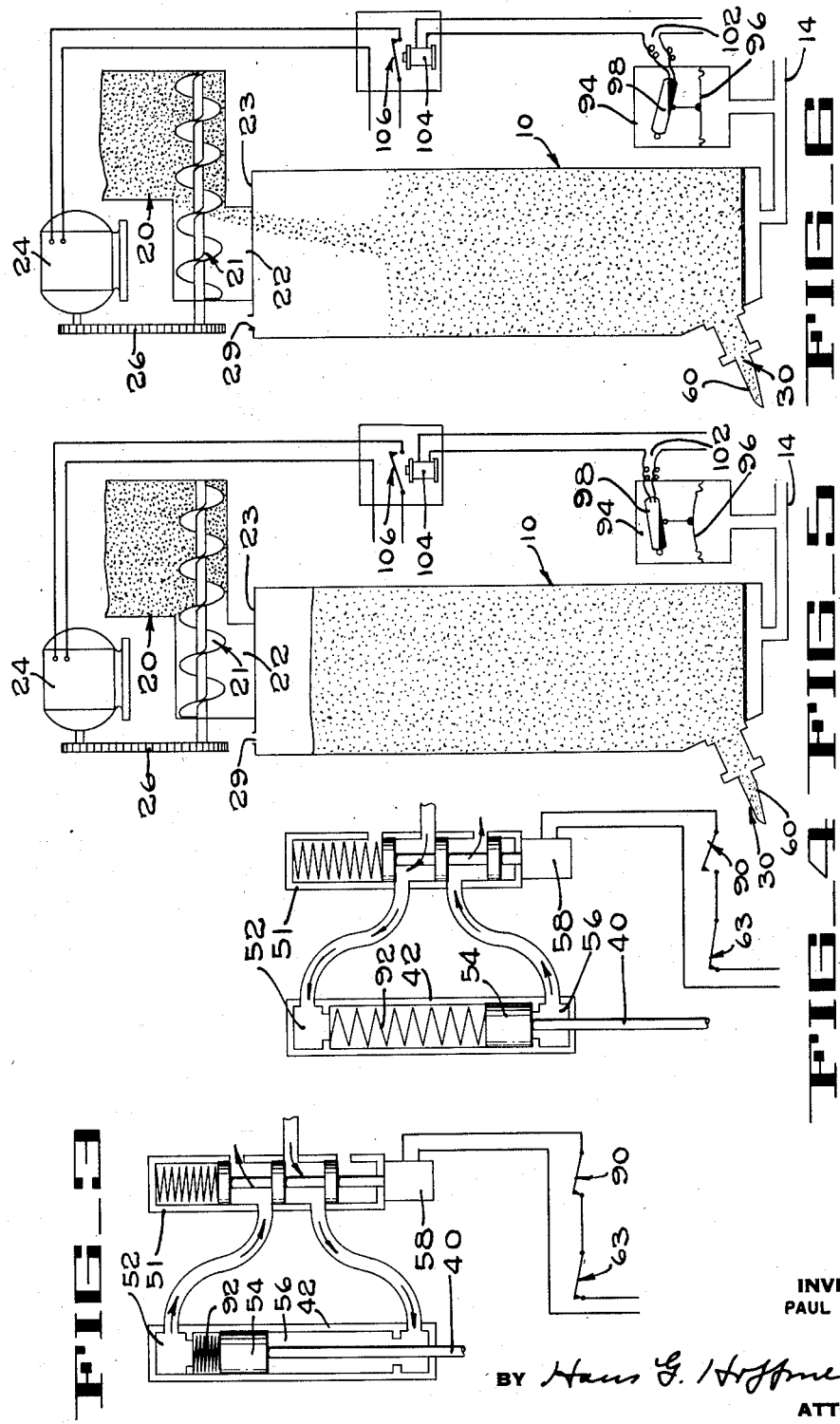

APPARATUS FOR FILLING POWDERED OR GRANULAR MATERIALS INTO CONTAINERS

Paul C. Aust, Mission San Jose, Calif., assignor to Food Machinery and Chemical Corporation, San Jose, Calif., a corporation of Delaware Application September 17, 1954, Serial No. 456,676

1 Claim. (Cl. 222—56)

The present invention relates to apparatus for filling powdered or granular materials into containers such as bags. More particularly, the present invention relates to apparatus of the type referred to which employs aeration of the powdered or granular materials to facilitate delivery thereof into bags and to achieve high packing densities of the material in the bags.

Apparatus of the type referred to comprises usually a tank into which the material to be packed is delivered and wherein the said material is agitated with rising currents of air or other gaseous media to assume the characteristics of a liquid. The apparatus also comprises a discharge spout at the lower end of the tank through which the material discharges under the weight of the fluidized column within the tank, and a supporting structure for the bag to be filled. Said supporting structure forms usually part of an adjustable scale that is arranged to actuate a spout control mechanism to block flow of the material through the spout whenever the amount of material delivered into the bag reaches a predetermined weight.

It is an object of the present invention to improve the filling accuracy of bag filling apparatus of the type referred to.

Another object is to provide a bag filling apparatus of the type referred to that is capable of filling accurately uniform quantities of powdered or granular material into the bags.

Another object is to provide a bag filling apparatus of the type referred to which has a substantially constant level of the aerated material within its tank.

Another object is to provide means automatically effective to maintain the column of aerated material within the tank at a substantially constant level.

These and other objects of the present invention will be apparent from the following description of the accompanying drawings which illustrate a preferred embodiment thereof and wherein:

Fig. 1 is a fragmentary perspective of a bag filling apparatus embodying the invention.

Fig. 2 is an enlarged fragmentary perspective of the spout of the bag filling apparatus and associated mechanisms.

Figs. 3 and 4 are combined electric and pneumatic circuit diagrams illustrating different operational positions of the control mechanism for the spout illustrated in Fig. 2.

Figs. 5 and 6 are diagrams illustrating different operational positions of an arrangement for replenishing the granular or powdered material in the tank of the bag filling apparatus shown in Fig. 1.

The bag filling apparatus illustrated in Fig. 1 comprises a tank 10 of substantial height, which rests upon a pedestal 12. Air from a suitable source of low air pressure, such as a blower (not shown), is delivered through a pressure regulator 13 into a conduit 14 which is disposed below the floor 16 of the tank. From said conduit rise a number of branch pipes 18 that extend through the tank floor 16 into the interior of the tank and which carry above their discharge ends baffle plates 19 to spread the incoming air streams laterally over the horizontal compass of the tank. Disposed above and laterally displaced from the tank 10 is a hopper 20 into which the material to be packed is dumped (Figs. 5 and 6), and from the bottom of said hopper 20 a horizontally disposed worm conveyor 21 delivers the material to a point above an opening 22 in the ceiling 23 of tank 10 from where it may drop into said tank, as shown in Fig. 6. A motor 24 is arranged to drive the worm conveyor 21 through a sprocket chain 26, or like means of power transmission.

Suitably secured a limited distance above the baffle plates 19 is a horizontally disposed sheet 28 of porous material, such as fabric, wire screen, or a porous composition. Through the many pores of said sheet the air introduced at the bottom of the tank rises in a multitude of minute currents in contact with the material within the tank to escape eventually through a suitable vent 29 provided at the upper end thereof. By appropriate choice of the pressure with which the air is introduced into the tank and which may be predetermined by proper adjustment of pressure regulator 13, the velocity of these air currents may be so proportioned relatively to the particle size and specific gravity of the material to be bagged that it places said material into a condition resembling a fluid. When in this condition, the material flows readily out of tank 10 through a slanting spout structure 30 arranged at its lower end above the level of the porous sheet 28.

The spout structure 30 is provided with control mechanism 32 that normally blocks the flow of material through said spout and which may be operated to permit flow of the material therethrough. To this end the spout structure 30 comprises a tubular section 34 of resilient material (Fig. 2). Above and below said resilient tube section are arranged horizontally disposed parallel rods 36 and 38 that are normally held so closely to each other as to pinch the resilient tube section and thus prevent the flow of material therethrough. For this purpose the upper rod 36 is secured to the normally downwardly projected piston rod 40 of a pneumatic cylinder 42 that is mounted above the spout structure upon a crescent shaped channel 44 which is supported from the front wall 45 of tank 10. Journalled in the opposite points of the crescent shaped mounting channel 44 are bellcranks 46a and 46b, respectively, whose inner ends are pivotally connected through short links 48a and 48b to the upper pinching rod 36 while their outer ends are pivotally connected through elongated links 50a and 50b, respectively, to the opposite ends of the lower pinching rod 38 in such a manner as to hold it tightly against the resilient tube section 34.

Operation of the pneumatic cylinder is controlled by the valve 51 which directs normally compressed air from a suitable source (not shown) into the space 52 above the piston 54 of cylinder 42 while connecting the cylinder space 56 below the piston 54 to the outside atmosphere (Fig. 4) so that the piston rod 40 is normally in the hereinbefore mentioned downwardly projected position illustrated in Fig. 2. However, energization of a solenoid 58 associated with the valve 51 is effective to shift said valve into a position wherein the defined connections are reversed, i.e., compressed air is delivered into the cylinder space 56 below the piston 54 and the cylinder space 52 above the piston 54 is connected to the outside atmosphere, as shown in Fig. 3. Under these conditions the piston rod 40 is retracted and withdraws the upper pinching rod 36 from the resilient section of the spout; upward movement of said upper pinching rod raises the inner ends of the bellcranks 46a and 46b which lowers their outer ends and, as a result thereof, the lower pinching rod 38 is downwardly withdrawn from the resilient spout section 34. This permits said spout section to expand and fluidized material may flow therethrough to the terminal end 60 of the spout structure which forms the actual filling spout. Over said filling spout 60 may be engaged the material receiving snout of an empty bag that may be held in engagement with the spout by a manually operable clamping mechanism 62. Said clamping mechanism may be arranged to close a normally open switch 63 in the power circuit of the solenoid 58, (Figs. 3 and 4) when closed upon the snout of a bag on the spout 60, to effect energization of the solenoid 58 and thus initiate flow of the material through the spout as soon as a bag is engaged thereover.

During the filling operation the bag to be filled rests upon a saddle 64 that is pivotally supported from the lower end of a substantially vertical post 66. Said post possesses a pair of laterally projecting L-shaped arms 68a and 68b whose free ends are pivotally supported from the free ends of a U-shaped stirrup 70 that embraces the post 66 with its L-shaped arms. Said stirrup 70 forms a scale and to this effect it is provided with outwardly turned ears 72a and 72b at intermediate points of its side bars 74a and 74b. These ears rest upon knife edges 76 (only one of which is visible in Fig. 1) that are mounted in and project upwardly from a pair of transversely spaced horizontally disposed parallel girders 78a and 78b which form part of the pedestal 12 of tank 10. Projecting rearwardly from the connecting bar 80 of said stirrup is a threaded rod 82 upon which is adjustably engaged a counterweight 84.

As long as the weight of the material in the bag is below the level determined by adjustment of the counterweight, the stirrup 70 is in the rearwardly tilted position illustrated in Fig. 1, wherein a lug 86 projecting laterally from the crossbar 80 of the stirrup 70 depresses the operating button 88 of a normally open switch 90 and keeps said switch closed. The switch 90 lies in the power circuit of the hereinbefore described solenoid 58 that controls the position of the pneumatic cylinder (Figs. 3 and 4). As long as the power circuit of said solenoid 58 is closed and said solenoid is energized, it maintains the air control valve 51 of pneumatic cylinder 42 in the position illustrated in Fig. 3 wherein air is delivered into the cylinder space 56 below the piston 54 and the cylinder space 52 above the piston is connected to the outside atmosphere. Under these conditions the piston rod 40 is retracted into the cylinder and the pinching rods 36 and 38 are withdrawn from the resilient section 34 of the spout structure permitting flow of material from the tank through the spout into a bag on saddle 64, as previously explained. However, when the weight of the material in the bag exceeds the weight established by adjustment of the counterweight 84, the stirrup 70 tilts forwardly and the lug 86 releases the actuating button 88 of switch 90. As a result thereof the switch 90 opens, the solenoid 58 is de-energized, and the valve 51 reverses its position and delivers compressed air into the space 52 above the piston 54 of cylinder 42 while connecting the cylinder space 56 below the piston 54 to the outside atmosphere (Fig. 4). This in combination with a spring 92 in cylinder 42 causes the piston rod 40 to project from the cylinder which is effective to close the pinching rods 36 and 38 upon the resilient tube section of the spout structure 30. Flow of material through the spout structure into the bag upon saddle 64 will therefore cease promptly after the stirrup 70 begins to tilt out of its rearwardly inclined position of rest. However, due to the inertia of the described train of actuating components a limited period of time will invariably elapse from the moment when the stirrup begins to tilt under the weight of the material in the bag unitl the pinching rods 36 and 38 have actually closed upon the resilient spout section 34, and during this limited period of time material will continue to flow from the tank into the bag and may fill varying amounts of material into the bag, depending upon the flow rate of the material at the particular moment. This "after-flow" of material may be a troublesome source of non-uniformities in the weight of the filled bags.

I have found that the amount of aerated material flowing through the discharge spout during a given time interval may be kept practically constant by maintaining the column of aerated material within the tank at a substantially constant level. In this manner the weight of bags filled by machines of the type described may be kept at a very high degree of uniformity. In accordance with the invention I therefore provide in bag filling apparatus of the type described means for maintaining the height of the fluidized column of powdered or granular material in the tank substantially constant.

For this purpose the back pressure in the air supply conduit 14 may be employed to control operation of the worm conveyor 22. Whenever the height of the aerated column in tank 10 drops, the back pressure in conduit 14 will also drop, and vice versa, whenever the height of the column in tank 10 increases, the back pressure in conduit 14 increases likewise. A drop in the back pressure within conduit 14 below a predetermined standard is therefore indicative of a drop in the height of the aerated column within the tank below a desired standard level, and in accordance with the invention this drop in the back pressure of conduit 14 is employed to start operation of motor 24 which drives the worm conveyor 22; vice versa, a rise in the back pressure within conduit 14 above said standard is indicative of a rise in the height of the fluidized column within the tank 10 above the standard level, and in accordance with the invention this rise in the back pressure within conduit 14 is therefore employed to bring the motor 24 to a halt.

Having reference to Figs. 1, 5 and 6, a pressure responsive switch assembly such as illustrated at 94, is connected to the air supply conduit 14 at a suitable point between the tank 10 and the pressure regulator 13. As long as the pressure in conduit 14 is below a certain limit of, say, 5 pounds, the membrane 96 within the pressure responsive switch assembly is in the flattened condition shown in Fig. 6 and maintains a mercury switch 98 in a position wherein a body of mercury connects the terminals of an interruption 102 in the power circuit of a relay 104 causing energization of said relay. When energized the relay 104 operates to close a normally open switch 106 in the power circuit of the motor 24. Thus, as long as the pressure in conduit 14 is below standard, which indicates that the height of the column of aerated material within tank 10 is below its desired level, the motor 24 is maintained in operation and material is delivered from the hopper 20 into the tank 10 (Fig. 5). When the column of aerated material within the tank 10 rises above the desired level, however, the back pressure in conduit 14 rises above a predetermined standard, which flexes the membrane 96 in pressure responsive switch assembly 94 into the upwardly arched condition illustrated in Fig. 5, and shifts the mercury switch 98 into a position wherein the body of mercury recedes from the terminals of the interruption 102 in the power circuit of relay 104. With said power circuit thus interrupted, the solenoid is de-energized and allows switch 106 to return to its normally open position, which breaks the power circuit of motor 24 (Fig. 4). Thus, the worm conveyor 22 ceases to turn and there is no further supply of material to the tank 10 until the height of the aerated column within the tank 10 drops below the desired level. When this occurs, the back pressure in conduit 14 drops below its required standard and the membrane 96 flattens out shifting the switch 98 again into a position wherein the body of mercury covers the terminals of the power circuit of solenoid 104. The resultant energization of the relay starts the motor 24, and a fresh supply of material is delivered into the tank 10 to raise the level of the aerated column within said tank to the required height.

In this manner the pressure upon the material escaping from tank 10 through spout 30, when said spout is in open condition, is maintained substantially uniform and, as a result thereof, the amount of aerated material passing through said spout during the period of time that elapses from the moment when the stirrup 70 begins to tilt forwardly until the pinching bars 36 and 38 have actually closed upon the flexible spout section 34, will be very nearly the same for every operation of the spout control mechanism. In consequence thereof, all the bags filled by bag filling apparatus embodying my invention will be of a very accurately uniform weight.

While I have described my invention with the aid of a particular embodiment thereof, it will be understood that I do not wish to be limited to the specific constructional details shown and described by way of example, which may be departed from without departing from the scope and spirit of the invention.

When fluidization of granular or powdered materials is referred to in the above given description and in the following claim, this term is intended to mean not only full fluidization of the said materials, wherein they behave entirely as liquids, but also all those conditions of lesser aeration which reduce their natural angle of repose and will therefore permit said materials to flow down inclined surfaces that slant at angles less than their natural angle of repose.

I claim:

Apparatus for filling powdered or granular material into bags comprising a tank, electrically driven means at the upper end of said tank operable to feed the material into said tank, a discharge spout at the lower end of said tank, control means operable to open and close said spout, a conduit for delivering air into said tank at the lower end thereof at a volume sufficient to place the material within said tank in a condition resembling a fluid, a pressure chamber connected to said conduit, a flexible diaphragm in said pressure chamber, one side of said diaphragm being exposed to the pressure in said conduit and the other side to atmospheric pressure, and a switch in the circuit of said electrically driven feed means and mechanically connected to said diaphragm for actuation thereby, whereby a drop in the back pressure in said conduit below a predetermined level will actuate said switch to energize said feed means, and a rise in said back pressure above a predetermined level will actuate said switch to deenergize said feed means.

References Cited in the file of this patent

UNITED STATES PATENTS

| | | |
|---|---|---|
| 1,296,921 | Chambers | Mar. 11, 1919 |
| 1,616,547 | Pontoppidan | Feb. 8, 1927 |
| 1,851,017 | Middelboe | Mar. 29, 1932 |
| 2,009,408 | Middelboe | July 30, 1935 |
| 2,098,247 | Jarrier | Nov. 9, 1937 |
| 2,304,827 | Jewell | Dec. 15, 1942 |
| 2,331,208 | Ludi | Oct. 5, 1943 |
| 2,770,439 | Stafford | Nov. 13, 1956 |

FOREIGN PATENTS

| | | |
|---|---|---|
| 526,229 | Great Britain | Sept. 12, 1940 |